United States Patent [19]

Kallin

[11] 4,358,168

[45] Nov. 9, 1982

[54] THRUST BEARING

[75] Inventor: Ingmar N. Kallin, Goshen, Ind.

[73] Assignee: Chore-Time Equipment, Inc., Milford, Ind.

[21] Appl. No.: 213,824

[22] Filed: Dec. 8, 1980

[51] Int. Cl.³ .................. F16C 17/22; F16C 17/04
[52] U.S. Cl. ............................... 308/135; 308/140
[58] Field of Search ............... 308/135, 72, 29, 140, 308/170, DIG. 1, 158

[56] References Cited

U.S. PATENT DOCUMENTS 1,735,881 11/1929 Seastedt .......................... 308/140
2,607,819 8/1952 Sutton ............................. 308/29
2,609,253 9/1952 Brown ............................. 308/29

Primary Examiner—Lenard A. Footland
Attorney, Agent, or Firm—Trexler, Bushnell & Wolters, Ltd.

[57] ABSTRACT

A thrust bearing comprises a pair of bearing members and an intermediate seat member. The two bearing members are mountable to a rotating shaft and each includes a substantially spherical bearing surface. The seat member is held between the bearing members, but is free of said rotating shaft. This seat member has oppositely facing, substantially spherical bearing surfaces for mating with and bearing against the substantially spherical bearing surfaces of the two bearing members.

9 Claims, 7 Drawing Figures

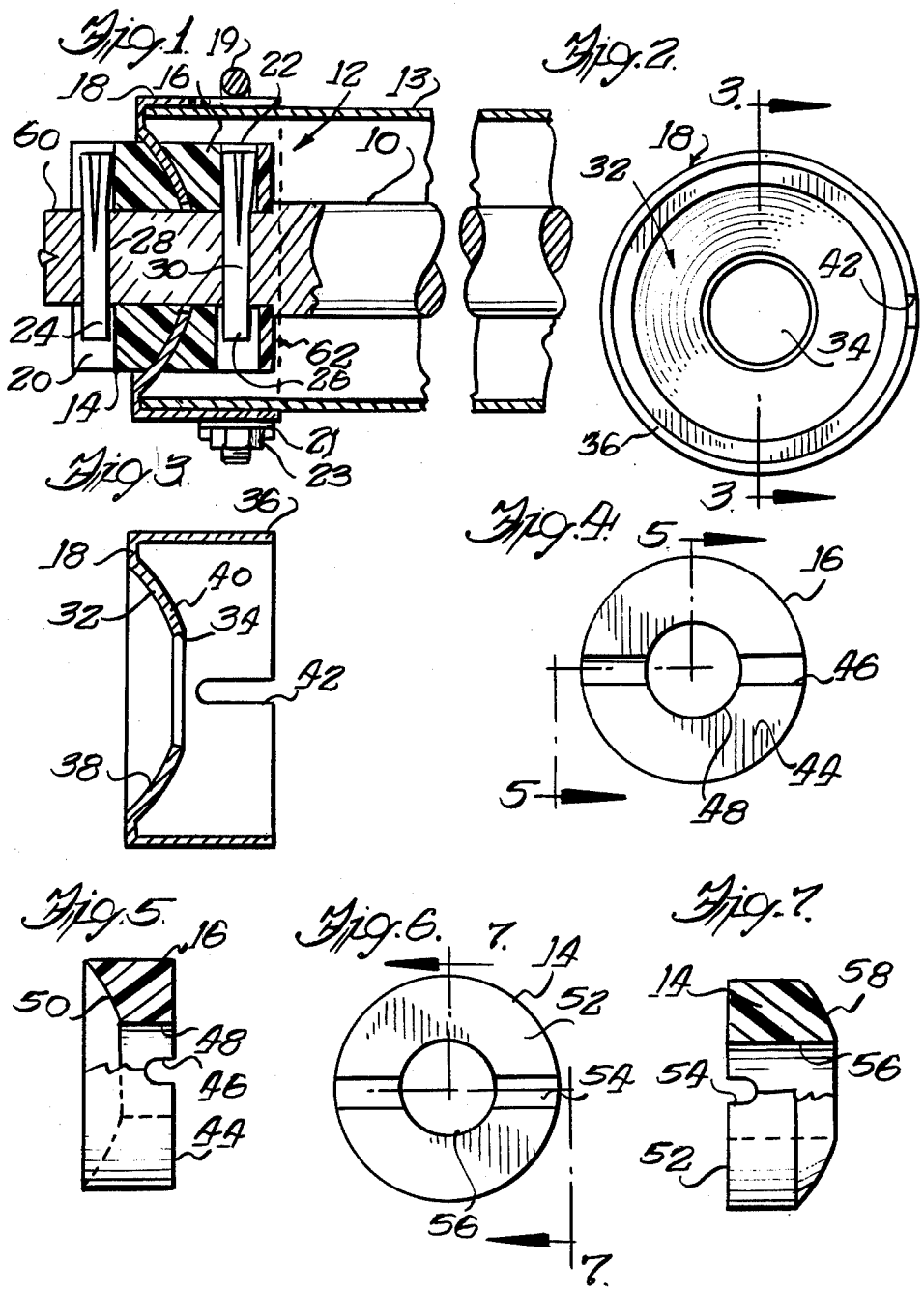

4,358,168

THRUST BEARING

BACKGROUND OF THE INVENTION

This invention is directed to a novel bearing, and more particularly to a novel thrust bearing for use in automated livestock feeding equipment.

Thrust bearings for livestock feeding equipment generally are required to operate at low to moderate shaft speeds. In many applications, thrust bearings are required which will carry thrust in both directions and have some capacity for radial loading as well as thrust. Moreover, such bearings must be capable of operating in dusty, abrasive environments.

In this latter regard, livestock feeding equipment generally is required to operate in dusty, dirty areas where livestock is present. In addition, the feed and other materials carried in the lines operated by the shafts on which the thrust bearings are used tend to fill the surrounding atmosphere with dust and small, hard abrasive particles. Accordingly, thrust bearings utilized in such applications must be relatively impervious to damage from such dust and/or abrasive particles.

Additionally, from an economic standpoint, it is desirable to provide thrust bearings at a minimal cost, which are nonetheless highly reliable over a long service life in such an environment. It is also desirable that such thrust bearings provide some degree of misalignment capability, when mounted to an associated shaft, to avoid binding and consequent increased wear and shorter service life. Moreover, some prior art bearings are known to experience thermal creep under load, which can lead to changes in bearing dimensions and thereby substantially shorten the service life of the bearing.

OBJECTS AND SUMMARY OF THE INVENTION

Accordingly, it is a general object of this invention to provide a novel and improved thrust bearing.

A more specific object is to provide such a thrust bearing which is capable of reliable operation over a long service life in a dusty, abrasive environment.

A related object is to provide such a thrust bearing which is capable of carrying thrust in both directions.

A further object is to provide such a thrust bearing which minimizes thermal creep under load, thereby maintaining bearing dimensions and contributing to a long service life.

Yet another object is to provide such a thrust bearing which is economical in its design and manufacture and yet is reliable in operation over a long service life.

A related object is to provide a thrust bearing which does not require lubrication while in service.

Briefly, and in accordance with the foregoing objects, a thrust bearing according to the invention comprises at least one bearing member including a substantially spherical bearing surface.

BRIEF DESCRIPTION OF THE DRAWINGS

The foregoing as well as other objects, features and advantages of the invention will be more readily understood upon reading the following detailed description of the illustrated embodiment, together with reference to the drawings, wherein:

FIG. 1 is a side elevation, partially in section of an assembled thrust bearing, in accordance with the invention, mounted to a rotating shaft;

FIG. 2 is a front elevation of a bearing seat member of the bearing of FIG. 1;

FIG. 3 is a sectional view taken generally along the line 3—3 of FIG. 2;

FIG. 4 is an elevational view of a bearing component of the thrust bearing of FIG. 1;

FIG. 5 is a side view, partially in section, taken generally along the line 5—5 of FIG. 4;

FIG. 6 is an elevational view of a second bearing component of the thrust bearing of FIG. 1, and FIG. 7 is a side view, partially in section, taken generally along the line 7—7 of FIG. 6.

DETAILED DESCRIPTION OF THE ILLUSTRATED EMBODIMENT

Referring now to the drawings and initially to FIG. 1, a shaft 10 has mounted thereon an assembled bearing constructed in accordance with the present invention and designated generally by the reference numeral 12.

This thrust bearing 12 comprises a first bearing member 14, a second bearing member 16 and an intermediate seat member 18. Each of the bearing members 14, 16 includes a through groove or slot 20, 22 which receives a pin 24, 26. These pins 24, 26 extend through respective through-apertures 28, 30 of the shaft 10, for joining their respective bearing members 14, 16 for rotation in unison with the shaft 10. Thses pins 24, 26 also serve to hold the thrust bearing 12 in assembled condition upon the shaft 10.

Referring now to FIGS. 2 and 3, the bearing seat member 18 is illustrated in additional detail. This seat member 18 is preferably of a metallic material and includes a spherical wall portion 32 having a central through opening 34 for receiving the shaft 10. The diameter of the through opening 34 is greater than the diameter of the shaft 10 to permit the shaft 10 to rotate freely therein. The bearing seat member 18 also includes a radially outward, axially extending flange portion 36, which in the illustrated embodiment is of sufficient axial extent to surround the bearing member 16, but is radially spaced apart therefrom (see FIG. 1). The spherical or curved wall portion 32 provides a concave spherical surface 38 to one side thereof and a convex sperical surface 40 at the other side thereof.

In the illustrated embodiment, the shaft 10 carries an auger-type feed conveyor for use in a livestock feed delivery system. Accordingly, this shaft 10 is substantially centrally located in a cylindrical, metallic auger-tube 13. Advantageously, the seat member 18 forms an end cap for this tube 13, whereby the bearing 12 serves to mount the shaft 10 for rotation with respect to the tube 13. Conventional means such as a U-bolt 19 and a cooperating strap 21 and nuts 23 serve to clamp the axially extending flange portion 36 securely to the outer periphery of the tube 13. In this regard, a slot 42 is formed in the peripheral flange 36 to permit contraction of the flange portion 36 for securely engaging the end of the tube 13, in response to tightening of the nuts 23 upon the U-bolt 19.

Referring now to FIGS. 4 and 5, the bearing member 16 will now be described. The bearing member 16 includes a substantially flat surface 44 across which is formed a diametrically extending slot or groove 46 for receiving the retaining pin 22. A through central opening 48 is of substantially similar diameter to that of the shaft 10 to encourage a relatively close fit therebetween and rotation of the bearing member 16 in unison with the shaft 10. Advantageously, this relatively close fit between the shaft 10 and the bearing member 16 provides "tri-axial" restraint to the bearing, so as to minimize thermal creep thereof under load. This in turn helps to maintain the dimensions of the assembled bearing 12 and contributes to a long service life thereof.

Referring now to FIG. 5, the bearing member 16 will be seen to include a concave, generally spherical bearing surface 50 which complements or mates with the convex spherical bearing surface 40 provided on the bearing seat member 18. Advantageously the bearing member 16 is composed of an oil-filled plastics material, acetal plastic being utilized therefor in the illustrated embodiment.

Reference is next invited to FIGS. 6 and 7 wherein the bearing member 14 is illustrated. This bearing member 14 includes a substantially flat outer surface 52 which carries a diametrically running groove or slot 54 for receiving the retaining pin 28. A central through opening 56 is also provided for receiving the shaft 10. Preferably this opening 56 is of similar diameter to the portion of the shaft 10 received therethrough to encourage a relatively close fit of the bearing member 14 with the shaft 10. Referring also to FIG. 7, it will be seen that the side or face opposite the side 52 of the bearing member 14 is provided with a convex, substantially spherical bearing surface 58 which complements or mates with the concave bearing surface 38 of the bearing seat member 18. Like the bearing member 16, the bearing member 14 is preferably composed of an oil-filled plastics material, such as an acetal plastic.

In operation, the bearing 12 comprising the bearing members 14 and 16 and the bearing seat member 18 is held in assembled relation on a stepped-down portion 60 of the shaft 10. The through apertures 28, 30 in this portion 60 of shaft 10 are spaced apart a suitable distance to hold the bearing 12 together in assembled relation when the slots or grooves 46, 54 of the bearing member 16, 14 are aligned therewith and the pins 24, 26 are inserted therethrough.

A disc-shaped spacer member 62 is also utilized in the illustrated embodiment to position the assembled thrust bearing 12 on the stepped-down portion 60 of the shaft 10.

Advantageously, the mating concave-convex spherical bearing surfaces 38, 40 of the bearing seat member 18 and 50, 58 of the bearing members 16, 14 provide some misalignment capability. That is, the shaft 10 may be somewhat misaligned without experiencing binding or increased wear of the thrust bearing 12, since the spherical bearing surfaces tend to provide a like distribution of force even in the presence of some misalignment.

In accordance with another feature of the invention, the metallic seat member 18 provides a heat sink function for the bearing 12. In this regard, the member 18 provides a metallic path for heat conduction when tighly secured by the U-bolt clamp 19 to the metal tube 13, thereby carrying off much of the heat generated during rotation of the bearing members 14, 16.

In accordance with a further feature of the invention, the axially extending flange portion 36 of the seat member 18, in addition to providing a heat sink for dissipating heat generated during operation also provides shielding against the entry of dust or abrasive particles into the region of the engaged bearing seats 40, 50 of the seat member 18 and bearing member 16. Additionally, such protection is afforded by the concavity of the bearing surface 50, in which the mating bearing surface 40 is received. Similar protection is afforded the engaged bearing surfaces 38, 58 by the concavity defined by the bearing surface 38 of the seat member 18.

Additionally, the bearing surfaces 38, 40 of the metallic seat member 18 are preferably heat-treated after forming to provide a hard, smooth surface. This hardness of this surface provides superior resistance to scratching of these bearing surfaces by the relatively hard, abrasive particles found in many feed materials. This smoothness of this surface assures close fit between the respective mating surfaces, resisting the entry of dust, etc., and at the same time assures smooth operation of the bearing, with minimal friction, thereby extending bearing life. Moreover, the relatively simple structure and low cost materials utilized in forming the bearing members 14, 16 and bearing seat member 18 permit such thrust bearings to be relatively economically produced.

What has been illustrated and described herein is a novel thrust bearing. While the thrust bearing of the invention has been illustrated and described with reference to a preferred embodiment, the invention is not limited thereto. On the contrary, alternatives, changes or modifications may become apparent to those skilled in the art upon reading the foregoing descriptions. Accordingly, such alternatives, changes and modifications are to be considered as forming a part of the invention insofar as they fall within the spirit and scope of the appended claims.

The invention is claimed as follows:

1. A thrust bearing comprising: first and second bearing members and a seat member, said first and second bearing members being mountable to a rotating shaft and each including a substantially spherical bearing surface, and said seat member being mountable free of said rotating shaft and intermediate said first and second bearing members and having mating, substantially spherical bearing surfaces for bearing against the substantially spherical bearing surfaces of said first and second bearing members.

2. A thrust bearing according to claim 1 wherein said first bearing member bearing surface is substantially concave, said second bearing member bearing surface is substantially convex, and wherein said seat member includes a substantially spherical wall portion providing at opposing faces thereof said mating bearing surfaces for said first and second bearing member bearing surfaces.

3. A thrust bearing according to claim 1 wherein at least one of said bearing members is closely fitted to said shaft thereby providing tri-axial restraint to the bearing and maintaining the dimensions thereof.

4. A thrust bearing according to claim 1 wherein said bearing members comprise an oil-filled plastics material and said seat member comprises a metallic material for conducting heat away from said bearing members.

5. A thrust bearing according to claim 4 wherein said seat member includes a radially outward, axially extending flange portion spaced apart from and substantially surrounding one of said bearing members for conducting heat away from the bearing.

6. A thrust bearing comprising a first bearing member including a substantially spherical bearing surface, a seat member including a mating, substantially spherical bearing surface and a second bearing member including a substantially spherical bearing surface, said seat member including a second, substantially spherical bearing surface for mating with said second bearing member bearing surface and said seat member being mounted intermediate said first and second bearing members, and wherein one of said bearing members is closely fitted to a rotating shaft for providing tri-axial restraint to the bearing and for minimizing thermal creep under load and maintaining bearing dimensions.

7. A thrust bearing according to claim 6 wherein said first bearing member bearing surface comprises a substantially convex spherical surface, said second bearing member bearing surface comprises a substantially concave spherical surface and wherein said seat member includes a substantially spherical wall portion for providing respective concave and convex mating spherical bearing surfaces to each of said first and second bearing member bearing surfaces.

8. A thrust bearing according to claim 6 wherein said first and second bearing members comprise an oil-filled plastics material and wherein said seat member comprises a metallic material for conduction of heat away from the bearing.

9. A thrust bearing according to claim 6 wherein said seat member includes a radially outward, axially extending flange portion substantially surrounding and spaced apart from said bearing member to facilitate conduction of heat away from the thrust bearing.

* * * * *